Nov. 11, 1947.  L. B. SPENGLER  2,430,690
SPEED INDICATOR
Filed July 19, 1945
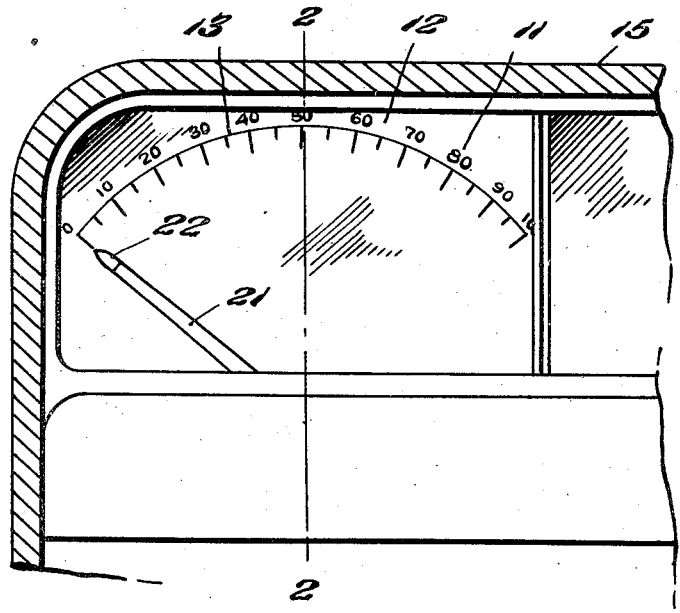
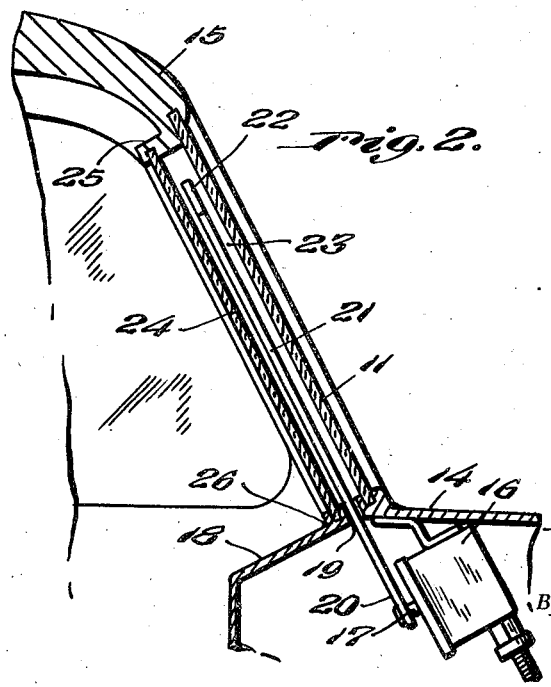
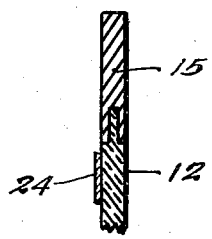
Inventor
Lester B. Spengler
By Clarence A. O'Brien
and Harvey B. Jacobson
Attorneys Patented Nov. 11, 1947

2,430,690

UNITED STATES PATENT OFFICE 2,430,690

SPEED INDICATOR

Lester B. Spengler, Concord, Calif.

Application July 19, 1945, Serial No. 605,934

1 Claim. (Cl. 116—116)

This invention relates to automotive vehicles and has for its object to provide a speed indicator directly in front of the eyes of a vehicle operator.

Another object of this invention is to provide a speed indicator including a graduated dial formed on a windshield and an indice hand invisible except at its indicating point.

A further and main object of the invention is to provide the combination of a windshield and speed dial.

Other features and advantages will become more readily apparent from the following description and the accompanying illustrative drawings in which:

Figure 1 is an elevational view of my invention,

Figure 2 is a sectional view taken on line 2—2 thereof, and

Figure 3 is a sectional view indicating a modification.

This invention comprises a windshield 11 upon the upper marginal portion 12 of which is provided a dial graduation 13 indicating various graduated rates of speed.

Mounted under the hood 14 of a car 15 using the above windshield is a speedometer 16, so placed that its oscillatable shaft 17, extends inwardly of the windshield 12, under the instrument panel 18, and in alignment with the slot 19 formed in said panel.

Fixedly mounted on the shaft 17 is the butt end 20 of a transparent indice hand 21 of suitable plastic material. The tip 22 of the indice 21 is colored to make it visible in order that a car operator who is sitting directly opposite the glass 12 may see the exact rate of speed at which he is traveling without taking his eyes from the road.

The graduated dial 13 may be etched, impressed or otherwise formed on the windshield glass and the characters thereof may be colored one or varying colors indicating various rates of speed. For instance, the characters "10" to "20" could be green for "going." From "20" to "35" blue for safety and from "40" on up, red for danger. Or colored blocks could be placed at the indicated places for the same purpose.

For protection to the indice hand 21, I prefer to encase the same within a dead air space 23, which space may be provided by a glass 24 or a substitute therefor set in frame members 25 and 26 slightly spaced from the windshield 11 or within the same.

In Figure 3 I show a modification of the invention in which, instead of having the graduated indicia directly formed on the glass windshield 23, I fix thereto a segmental tape of transparent material 24 with the indicia forming the speed dial. It is obvious that my windshield may have the dial formed upon any one of its marginal parts instead of upper margin 12, but I prefer the latter margin.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangements of details and parts such as come within the purview of the invention claimed may be resorted to, in actual practice, if desired.

Having now described my invention that which I claim as new and desire to procure by Letters Patent is:

In combination with a vehicle including a windshield formed with spaced front and rear panes of glass having a slot between their lower edges providing a dead air space between said panes of glass, speedometer readings arcuately displayed on the rear surface of said front pane of glass in direct line between a driver's line of vision and the road while driving, a speedometer disposed below said windshield, a transparent invisible speed indicator hand secured to said speedometer adapted to extend upwardly through said slot between the spaced panes of glass terminating in a visible colored indicating tip overlying said speedometer readings whereby the vehicle driver may be able to constantly see the speedometer readings without shifting his line of vision from the road.

LESTER B. SPENGLER.

REFERENCES CITED

The following references are of record in the file of this patent:

UNITED STATES PATENTS

| Number | Name | Date |
|---|---|---|
| 1,999,429 | Tibbetts | Apr. 30, 1935 |
| 2,023,934 | Moise, Jr. | Dec. 10, 1935 |
| 2,112,880 | Brewer | Apr. 5, 1938 |
| 2,264,044 | Lee | Nov. 25, 1941 |

FOREIGN PATENTS

| Number | Country | Date |
|---|---|---|
| 516,217 | Germany | Jan. 20, 1931 |
| 767,157 | France | July 12, 1934 |